(12) United States Patent
Huang

(10) Patent No.: US 8,739,814 B2
(45) Date of Patent: *Jun. 3, 2014

(54) WALL-MOUNTED FAUCET CONTROL MODULE

(75) Inventor: Li-Chen Huang, Changhua Hsien (TW)

(73) Assignee: Alexander Yeh Industry Co. Ltd., Changhua (TW)

(*) Notice: Subject to any disclaimer, the term of this patent is extended or adjusted under 35 U.S.C. 154(b) by 364 days.

This patent is subject to a terminal disclaimer.

(21) Appl. No.: 13/189,268

(22) Filed: Jul. 22, 2011

(65) Prior Publication Data

US 2013/0020518 A1 Jan. 24, 2013

(51) Int. Cl.
*F16K 31/00* (2006.01)
(52) U.S. Cl.
USPC .................................... 137/315.15
(58) Field of Classification Search
USPC .......... 137/315.12, 315.14, 315.15; 251/213, 251/231, 291, 292, 293; 74/548
See application file for complete search history.

(56) References Cited

U.S. PATENT DOCUMENTS

| 4,134,420 | A | * | 1/1979 | Okonowitz | 137/315.14 |
| 4,616,673 | A | * | 10/1986 | Bondar | 137/315.15 |
| 4,739,788 | A | * | 4/1988 | Reback | 137/15.18 |
| 4,842,009 | A | * | 6/1989 | Reback | 137/315.15 |
| 4,876,766 | A | * | 10/1989 | Cohen | 16/426 |
| 4,961,443 | A | * | 10/1990 | Buccicone et al. | 137/315.15 |
| 5,025,826 | A | * | 6/1991 | Schoepe et al. | 137/315.15 |
| 7,331,358 | B2 | * | 2/2008 | Gallina et al. | 137/315.15 |
| 7,987,869 | B2 | * | 8/2011 | Rosko et al. | 137/315.15 |
| 2013/0019708 | A1 | * | 1/2013 | Huang | 74/490.12 |

* cited by examiner

*Primary Examiner* — John K Fristoe, Jr.
*Assistant Examiner* — R. K. Arundale
(74) *Attorney, Agent, or Firm* — Che-Yang Chen; Law Office of Michael Chen

(57) ABSTRACT

A wall-mounted faucet control comprises: a control handle and three joints. Each joint has an insertion aperture. Each insertion aperture has a different cross-sectional shape such that the control handle can be installed with the various control rods. Each insertion aperture has a limiting aperture at one end, and the limiting aperture further provides a locking member and a washer. An assembling slot is disposed adjacent to the insertion aperture of each joint, and the assembling slot engages with a screwing member of the control handle. Two joints further have the securing aperture connected to the insertion aperture adjacent to the assembling slot, and the securing aperture engages with a securing member. The joints of the control handle can be correspondingly alternated for the various valve rods. The control handle can be installed with the various water valves, which can provide variety and convenience.

8 Claims, 6 Drawing Sheets

WALL-MOUNTED FAUCET CONTROL MODULE

BACKGROUND OF THE INVENTION

1. Field of the Invention

The present invention relates to a wall-mounted faucet control module, and more particularly to a wall-mounted faucet control module which has different elements that can be correspondingly alternated, such that the control handles can be installed with the various water valves, which can provide variety and convenience.

2. Description of the Related Art

Currently, people prefer faucets in various styles. Moreover, people like to do home improvement chores by themselves. However, each faucet has a control shaft having different cross-sectional shapes and dimensions, and so the consumer needs to select a matching faucet handle, which can be very inconvenient.

Therefore, it is desirable to provide a wall-mounted faucet control module to mitigate and/or obviate the aforementioned problems.

SUMMARY OF THE INVENTION

An objective of the present invention is to provide a wall-mounted faucet control module In order to achieve the above-mentioned objectives, a wall-mounted faucet control module configured for assembly comprises: a control handle having a containment space at a bottom face, the containment space of the control handle having a plurality of engaging ribs around an opening of the containment space and an assembly base, the engaging ribs having a groove at one end, the assembly base having a connecting rib and a through hole adjacent to the connecting rib, the through hole engaging with a screwing member; and a plurality of joints, each joint disposed on the connecting rib of a corresponding control handle and between the groove of the engaging ribs and the assembly base. Each joint having an insertion aperture, each insertion aperture accepting a valve rod of the water valve, each insertion aperture having a different cross-sectional shape, each insertion aperture having an assembly aperture at one end, the assembly aperture providing a locking member. An assembling slot is disposed adjacent to the insertion aperture of each joint, the assembling slot engaging with the screwing member of the control handle, and another two joints have a securing aperture connected to the insertion aperture adjacent to the assembling slot, the securing aperture engaging with a securing member.

With the above-mentioned structure, the following benefits can be obtained: since, the joints of the control handle can be correspondingly alternated for the various water valves, the faucet control module can be installed with the various water valves, which can provide variety and convenience.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
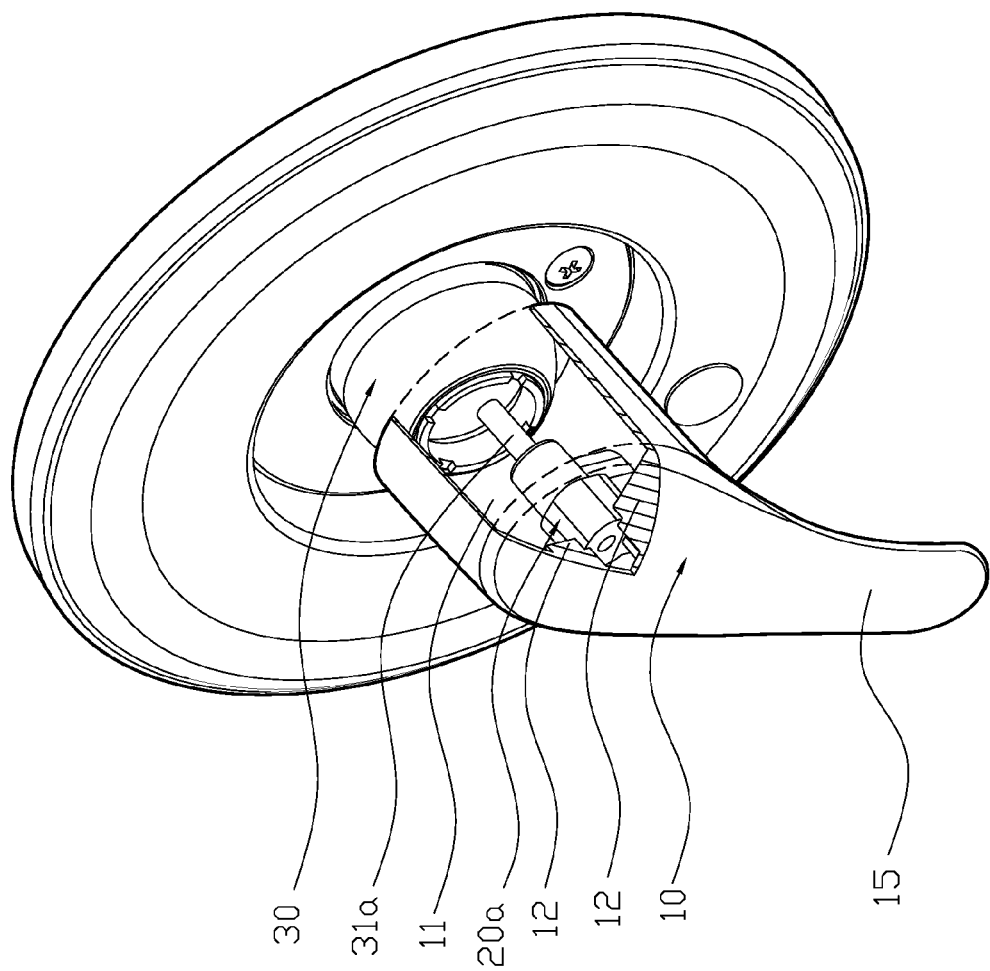
FIG. 1 is a perspective view of an embodiment of the present invention.

Please refer to FIG. 1, FIG. 2, FIG. 5 and FIG. 6. A wall-mounted faucet control module configured for assembly onto a wall surface A, comprises: a control handle 10 and three joints 20a, 20b, 20c. The control handle 10 has a containment space 11, and the containment space 11 of the control handle 10 has a plurality of engaging ribs 12 evenly disposed around an opening of the containment space 11 and an assembly base 13. Each engaging rib 12 has a groove 121 at one end, and the assembly base 13 has a connecting rib 131 and a through hole 14 adjacent to the connecting rib 12. The connecting rib 131 has a height corresponding to the height of the groove 121 of the engaging ribs 12. The through hole 14 is provided with a corresponding screwing member 141. The control handle 10 further has an extended handle portion 15. The joints 20a, 20b, 20c are disposed on the connecting rib 131 of on the control handle 10 and engage between the groove 121 of the engaging ribs 12 and the assembly base 13. The joints 20a, 20b, 20c respectively have an insertion aperture 21. The insertion aperture of the joint 20a has a circular cross-sectional shape; the insertion aperture 21 of the joint 20b has a rhomboidal cross-sectional shape, and the insertion aperture of the joint 20c has an elliptical cross-sectional shape. Each insertion aperture 21 has a limiting aperture 211 at one end, and the limiting aperture 211 further provides a locking member 212 and a washer 213. An assembling slot 22 is disposed adjacent to the insertion aperture 21 of each joint 20a, 20b, 20c, and the assembling slot 22 engages with the screwing member 141 of the control handle 10. Two joints 20a, 20b further have the securing aperture 23 connected to the insertion aperture 21 adjacent to the assembling slot 22, and the securing aperture 23 engages with a securing member 231.

Figure 2:
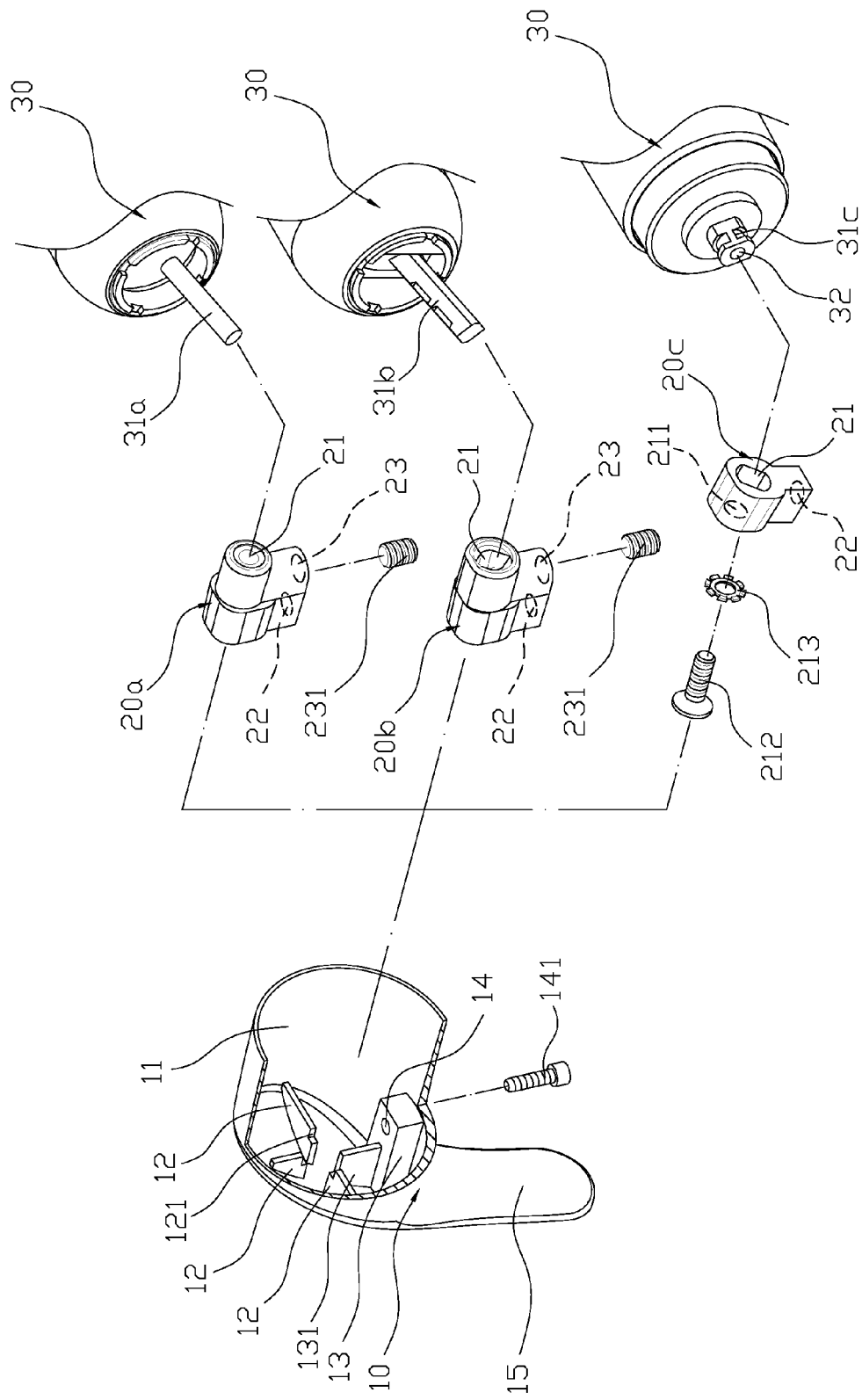
FIG. 2 is an exploded view of an embodiment of the present invention.

For actual use, please refer to FIG. 2. The faucet control module can be mounted using various control rods 31a, 31b, 31c of the water valves 30. The control rod 31a has a circular cross-sectional shape, and the control rod 31b has a rhomboidal cross-sectional shape. The control rod 31c has an elliptical cross-sectional shape and an installation aperture 32 at a free end of control rod 31c.

Figure 3:
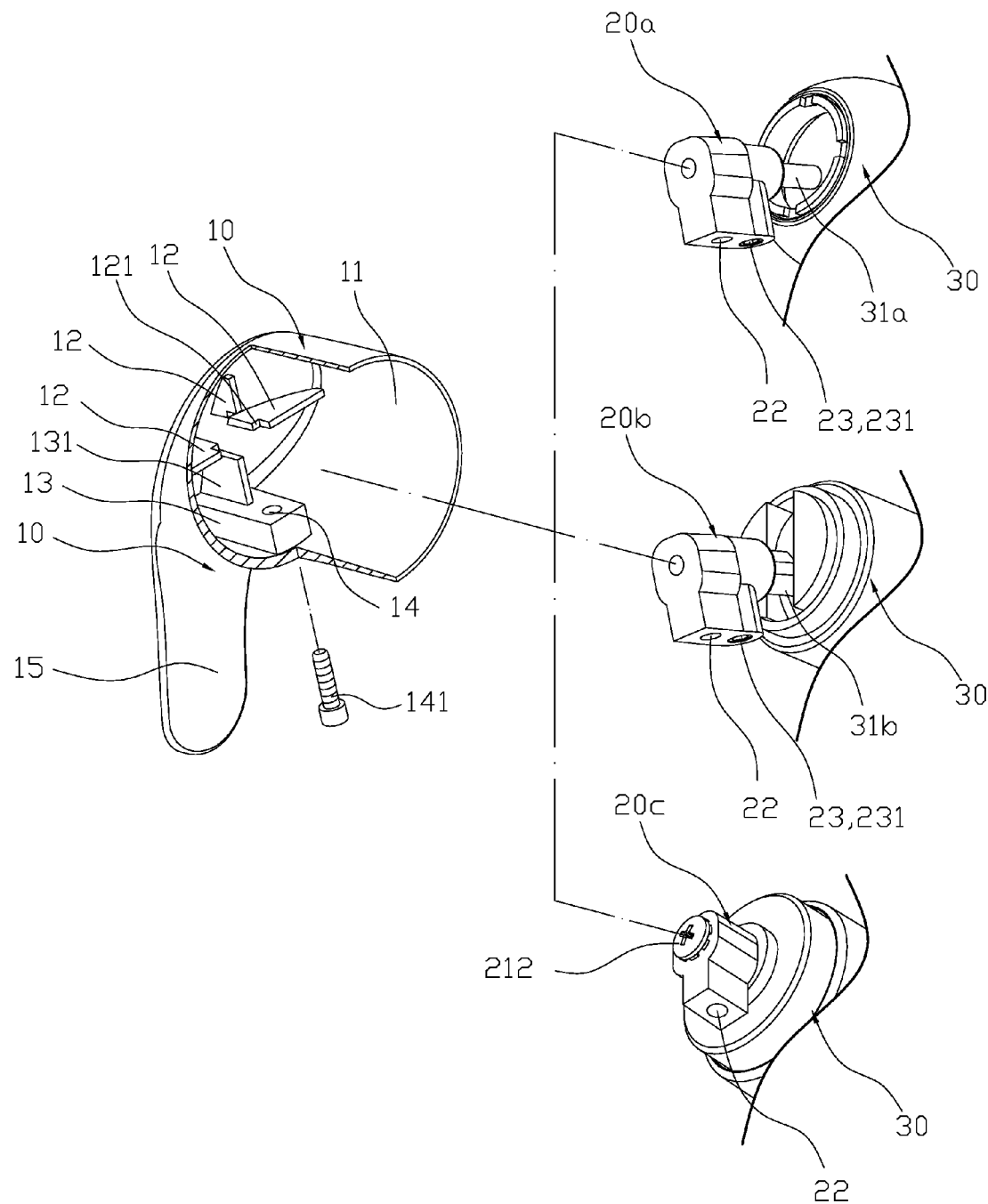
FIG. 3 illustrates assembly of an embodiment of the present invention.
Figure 4:
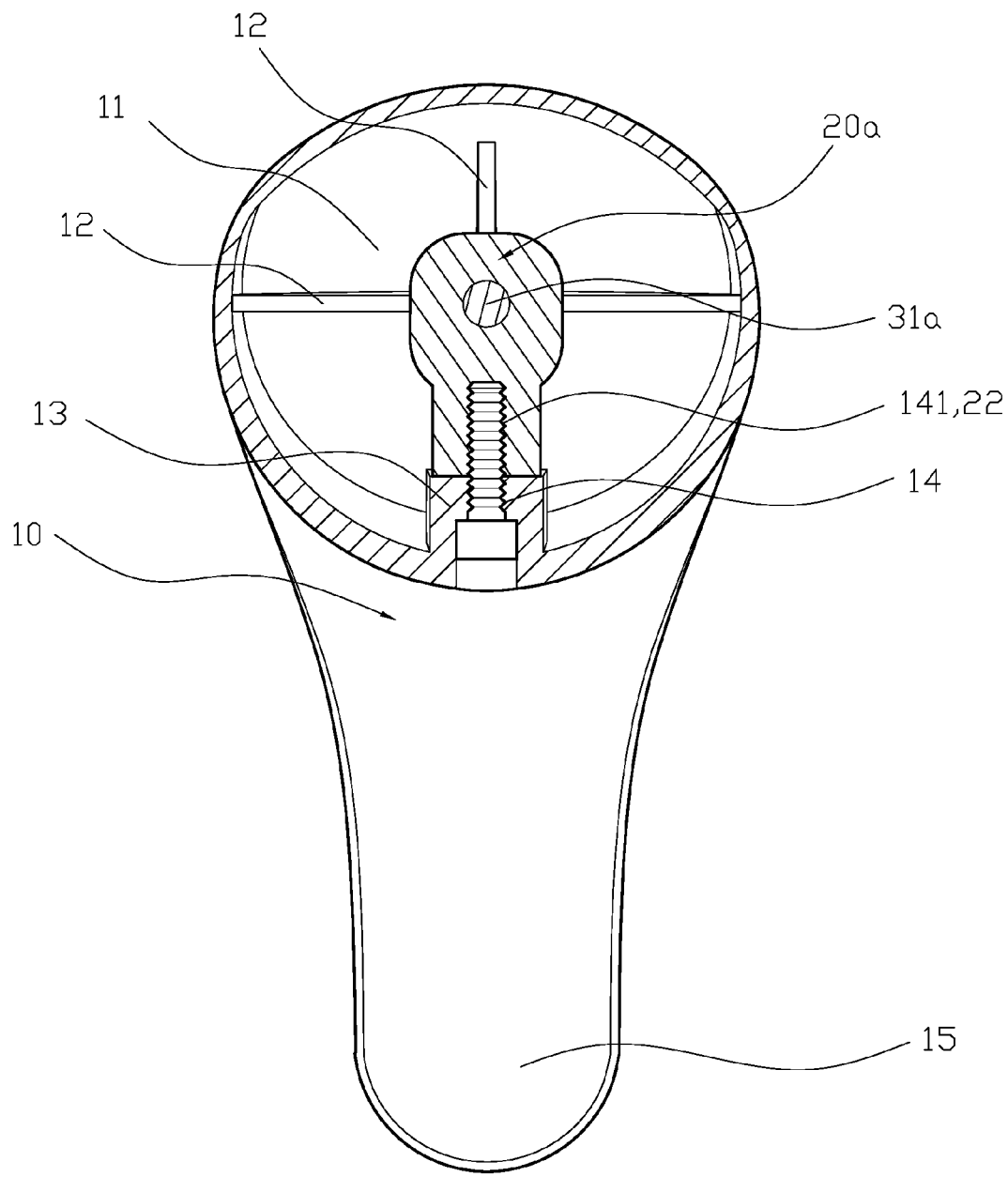
FIG. 4 is a cross-sectional view of a first combination of the present invention.
Figure 5:
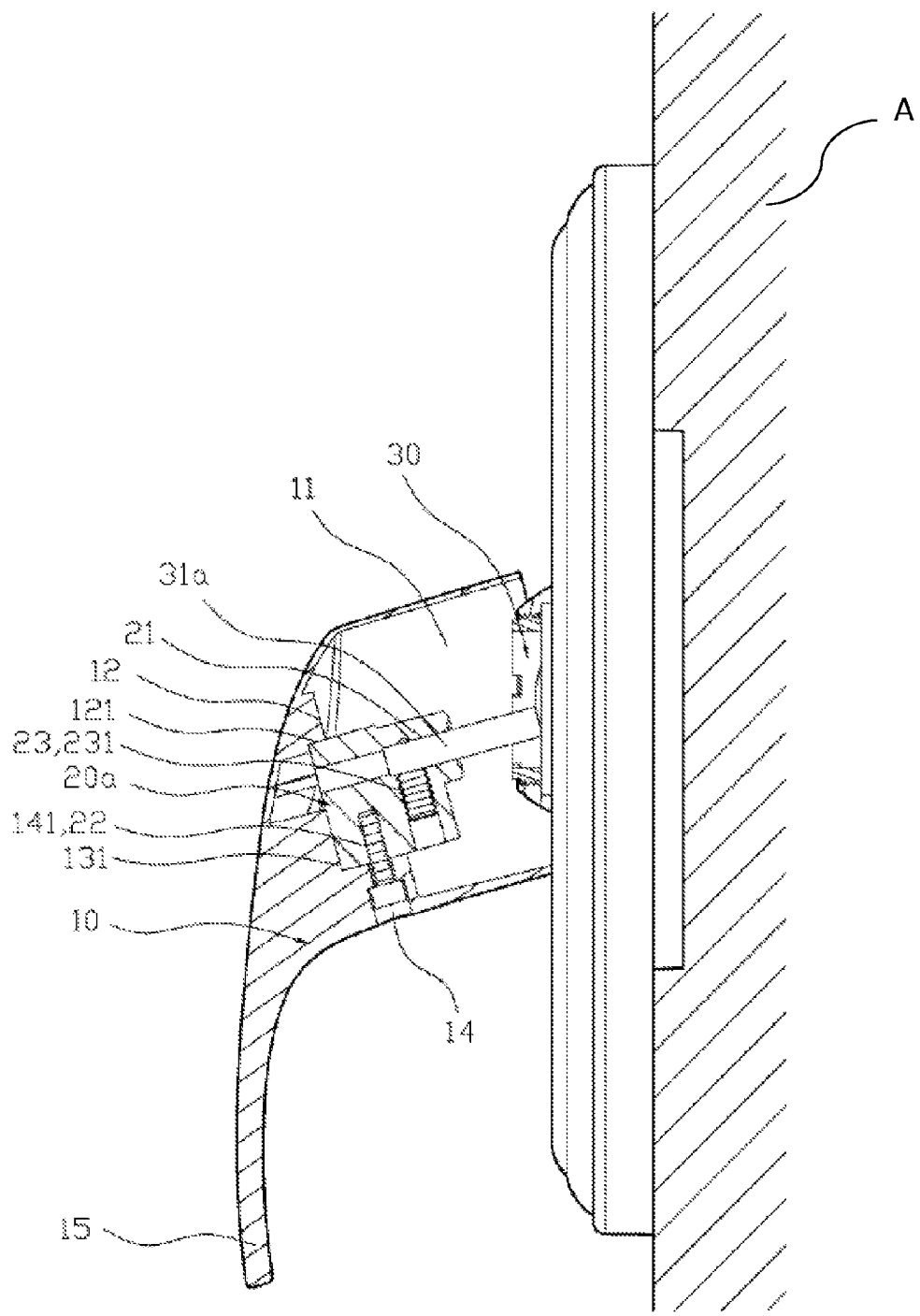
FIG. 5 is another cross-sectional view of the first combination of an embodiment of the present invention.

Please refer to FIG. 2 again. In order to install the faucet control module 10 onto the valve rod 31a or the valve rod 31b, first, the insertion aperture 21 of the joint 20a is jacketed onto the control rods 31a, 31b. The securing member 231 is screwed onto the securing aperture 23 and tightens the control rods 31a, 31b (as shown in FIG. 3), and the containment space 11 of the control handle 10 is jacketed onto the joints 20a, 20b and disposed on the connecting rib. Furthermore, the joints 20a, 20b are disposed on the connecting rib 131 to make the joints 20a, 20b engage with the groove 121 of the engaging ribs 12. The assembling slot 22 of the respective joint 20a, 20b is aligned with the through hole 14 of the control handle 10, and then the screwing member 141 is placed through the through hole 14 of the control handle 10 and secured onto the assembling slot 22 of the joint 20a, 20b, as shown in FIG. 4 and FIG. 5.

Figure 6:
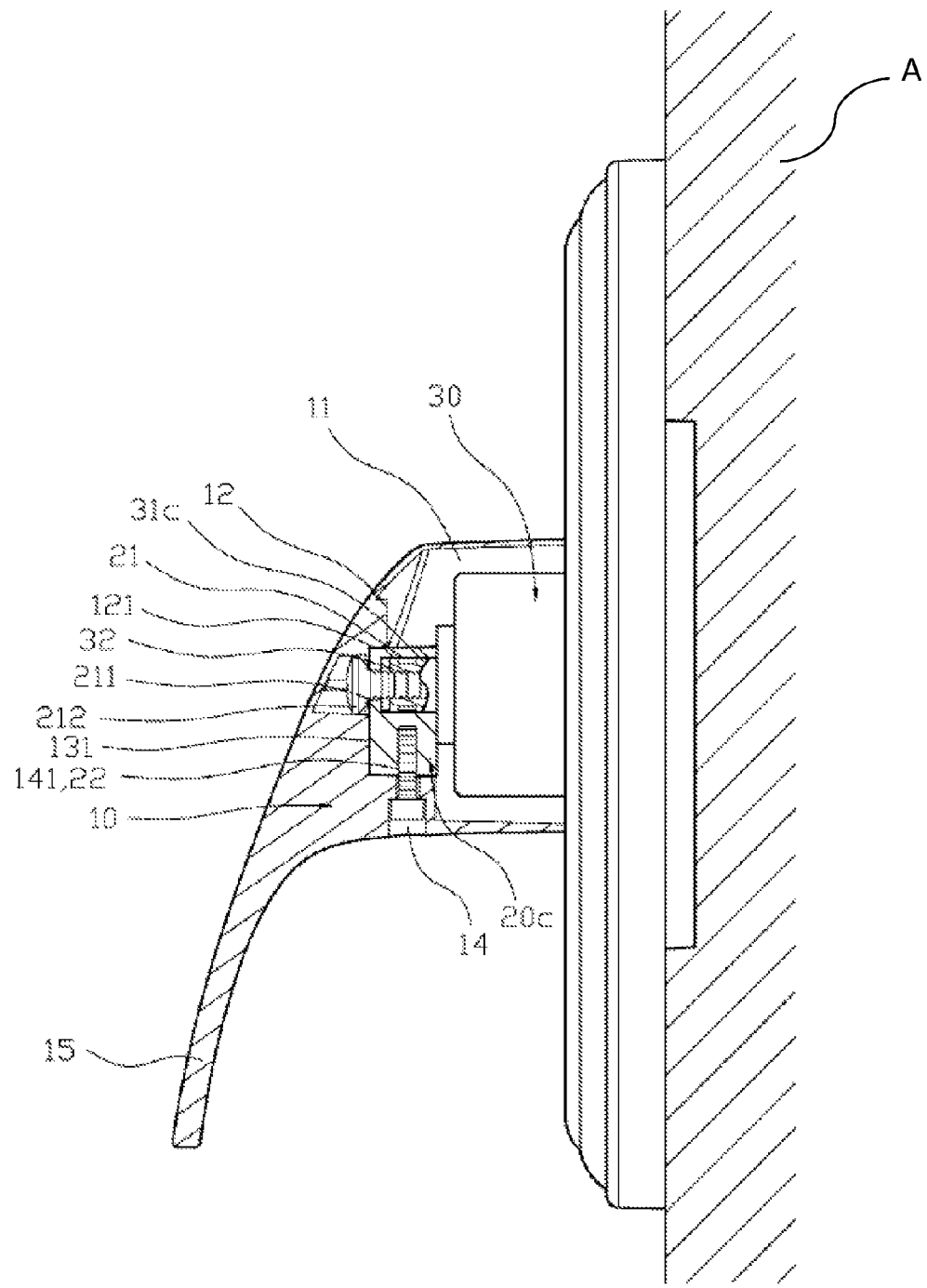
FIG. 6 is a cross-sectional view of a third combination of an embodiment of the present invention.

Please refer FIG. 2. In order to install the faucet control module 10 onto another the valve rod 31c, the insertion aperture 21 of the joint 20c is jacketed onto the control rods 31c, the locking member 212 is placed through the washer 213 and the limiting aperture 211 of the joint 20c and secured with installation aperture 32 of the control rod 31c, as shown in FIG. 3. Next, the containment space 11 of the control handle 108 is jacketed onto the joint 20c, the joint 20c is disposed on the connecting rib 131 to make the joint 20c engage with the groove 121 of the engaging ribs 12, the assembling slot 22 of the joint 20c is aligned with through hole 14 of the control handle 10, and then the screwing member 141 is placed through the through hole 14 of the control handle 10 and secured onto the assembling slot 22 of the joint 20c, as shown in FIG. 6. Since, the joints 20a, 20b, 20c, of the control handle 10 can be correspondingly alternated for the various types of valve rods 31a, 31b, 31 c, the control handle 10 can be installed with the various water valves, which can provide variety and convenience.

With the above-mentioned structure, following benefits can be obtained: the joints 20a, 20b, 20c, of the control handle 10 can be correspondingly alternated for the various valve rods 31a, 31b, 31c, and the control handle 10 can be installed with the various water valves, which can provide variety and convenience.

Although the present invention has been explained in relation to its preferred embodiment, it is to be understood that many other possible modifications and variations can be made without departing from the spirit and scope of the invention as hereinafter claimed.

What is claimed is:

1. A wall-mounted faucet control module configured for assembly comprising:
   a control handle having a containment space at a bottom face, the containment space having a plurality of engaging ribs around an opening of the containment space and an assembly base, the engaging ribs having a groove at an end, the assembly base having a connecting rib and a through hole adjacent to the connecting rib, the through hole engaging with a screwing member; and
   a plurality of joints, each joint configured to be disposed on the connecting rib of the control handle and engaging with the groove of the engaging ribs, each joint having an insertion aperture, each insertion aperture accepting a valve rod of the water valve, the insertion apertures having different cross-sectional shapes, at least one of the insertion apertures having a limiting aperture at one end, the limiting aperture provided with a locking member; wherein an assembling slot is disposed adjacent to the insertion aperture of each joint, the assembling slot engaging with the screwing member of the control handle, and at least two joints have a securing aperture connected to the insertion aperture adjacent to the assembling slot, the securing aperture engaging with a securing member.

2. The wall-mounted faucet control module as claimed in claim 1, wherein the engaging ribs and the assembly base of the control handle are evenly disposed.

3. The wall-mounted faucet control module as claimed in claim 1, wherein each connecting rib has a height corresponding to the height of the grooves of the engaging ribs.

4. The wall-mounted faucet control module as claimed in claim 1, wherein the control handle further has an extended handle portion.

5. The wall-mounted faucet control module as claimed in claim 1, wherein the insertion aperture of at least one of the joints has a circular cross-sectional shape.

6. The wall-mounted faucet control module as claimed in claim 1, wherein the insertion aperture of at least one of the joints has a rhomboidal cross-sectional shape.

7. The wall-mounted faucet control module as claimed in claim 1, wherein the insertion aperture of at least one of the joints has an elliptical cross-sectional shape.

8. The wall-mounted faucet control module as claimed in claim 1, wherein the limiting aperture further has a washer for accepting the locking member.

* * * * *